Patented Aug. 16, 1938

2,126,759

UNITED STATES PATENT OFFICE 2,126,759

COMPOSITE FABRIC AND METHOD OF MAKING SAME

Camille Dreyfus, New York, N. Y.

No Drawing. Application April 8, 1936, Serial No. 73,307

18 Claims. (Cl. 154—2)

This invention relates to the preparation of stiffened fabrics and also to wearing apparel or other technical or commercial articles formed in whole or in part of such stiffened fabrics.

This application is a continuation in part of my applications S. Nos. 743,835, filed September 13, 1934, and 17,930 filed April 24, 1935.

An object of my invention is to prepare fabrics of any desired degree of increased stiffness and in a simple and expeditious manner. A further object of my invention is to prepare wearing apparel and other technical or industrial articles consisting of or containing such stiffened fabric. Other objects of the invention will appear from the following detailed description.

In the making of stiffened fabrics by causing cellulose acetate or other organic derivative of cellulose to melt or coalesce by operations involving the application of heat and pressure, it has previously been considered necessary to have present during this operation acetone or other volatile organic solvent for the derivative of cellulose. The use of such volatile organic liquids is generally objectionable since these operations are normally conducted in rather small factories where no apparatus for the recovery or even the removal of the vapors of the organic liquid is provided. As a result, the operation entails the added cost of the organic liquid and even hazards to the health of the operators engaged therein. The presence of the vapors of the organic liquid in small factories may create a fire and explosion hazard.

I have found that if plasticizers for the cellulose acetate are present in the assembly containing cellulose acetate and fabrics to be united thereby, good stiffening effects and firm adhesion may be obtained by the application of heat and pressure if water or moisture is present during the pressing. That water may replace organic solvents for the cellulose acetate for this purpose is quite surprising in view of the fact that little, if any, adhesion is obtained under certain circumstances if no water is present during the hot pressing.

The products formed by this invention may be used for any purpose where a stiffened and/or relatively impermeable fabric is desired. An important application of such products is wearing apparel which may be formed in whole or in part of fabrics made or prepared in accordance with this invention. Thus collars or cuffs may be formed entirely of the product of this invention. Alternatively shirts may be made wherein the attached collars, neckbands, cuffs, fronts or bosoms are made of such products. Hats or parts of hats may likewise be formed of such material, as may also be the inner or sweat bands of hats, visors for caps, cuffs of gauntlets, inner linings for cravats, stiffening material used in the inner portions of garments, such as coats, to help retain the shape thereof, shoes and parts thereof, etc. The fabrics of this invention may be used for a variety of other purposes, and indeed may be used for any industrial or technical purpose where fabric of increased stiffness and/or impermeability is required.

In order that the desired degree of stiffening and adhesion be attained upon the hot pressing in the presence of water, it is of importance that there also be present in the assembly being treated a plasticizer or relatively high boiling or non-volatile solvent for the cellulose acetate. This plasticizer may be caused to be present in any manner. Thus it may be incorporated with the cellulose acetate in whatever form it may be present, either by way of the dope or spinning solution from which it is formed or by spraying, dipping or otherwise treating the cellulose acetate with a solution of the plasticizer in a volatile solvent or thinner such as benzol or preferably ethyl or methyl alcohol or other swelling or penetrating agent for the derivative of cellulose and permitting the solvent to evaporate. Alternately, the plasticizer may be applied to or incorporated with the non-thermoplastic fibres in which case the plasticizer may or may not be present in the cellulose acetate material.

Any suitable plasticizer or mixtures of plasticizers may be employed. Examples of suitable plasticizers for cellulose acetate are dimethoxyethyl phthalate, triacetin, diacetin diethoxyethyl phthalate, etc. In some cases it is advantageous to employ a mixture of water soluble and water insoluble plasticizers, so that upon subsequent laundering the whole or part of the water soluble plasticizer is removed. The amount of plasticizer present in the fabric containing same is between 35 and 50% or more on the weight of the said fabric. The lower the amount of derivative of cellulose in the plasticized fabric the larger is the amount of plasticizer used. The preferred plasticizer employed is a mixture of dimethoxyethyl phthalate and triacetin. The proportions of dimethoxyethyl phthalate to triacetin can be from 10% of triacetin in the dimethoxyethyl phthalate to equal proportions of each.

Small amounts of other plasticizers, swelling agents or similar materials may also be added to the mixture of dimethoxyethyl phthalate and triacetin, such as from 5 to 20% on the weight of the mixture of tricresyl phosphate, camphor and the like.

The plasticizer or plasticizer compound may be applied to the desired fabric in any suitable manner, such as by dipping, spraying, padding, etc. It is preferable when employing the dimethoxyethyl phthalate and triacetin mixture above specified to apply the same by dipping the fabric into a solution of the plasticizer in ethyl or methyl alcohol, preferably ethyl alcohol. Other solvents and thinners for the plasticizer which also has a slight swelling action on the cellulose acetate may be employed. Any amount of solvent may be employed for this purpose, for instance from 10 to 90 or more percent on the weight of the plasticizer of ethyl alcohol may be employed. The fabric is dipped into this solution and passed through a pair of squeeze rollers regulated with sufficient pressure that the desired quantity of plasticizer remains on the fabric. After treating the fabric with the plasticizer in the solvent or thinner, the solvent or thinner is allowed to evaporate. The evaporation of the solvent or thinner may be hastened by the application of heat.

In one form of this invention the assembly of fabrics with an intermediate layer comprising cellulose acetate employed as starting material may first be cut, sewn or otherwise shaped. After the desired articles, such as collars, cuffs or other wearing apparel or parts thereof are formed and plasticizer being present therein, they may then be treated with water and then subjected to heat and pressure to impart the desired stiffness and/or impermeability. In this manner the sewing of stiff material is avoided. In another form of my invention the intermediate layer need not contain cellulose acetate but the layers it contacts contains cellulose acetate. This latter arrangement of fabrics is more fully described in the parent application S. No. 17,930 which arrangement and teaching relating to same forms a part of this invention.

Products of this invention have any desired degree of stiffness, which is relatively permanent, so that they may be subjected to repeated laundering without substantially losing their stiffness. In this manner the use of starch or other extraneous stiffening materials during laundering may be avoided.

This invention may be carried out in a large number of ways, particularly as to the nature of the fabric or number of fabrics employed, provided that cellulose acetate in any form, such as powder, film or yarns or filaments is present in the fabric if a single fabric is used, or in or near at least one of the fabrics if a plurality of fabrics are used.

If the cellulose acetate is present in the form of yarns or filaments, there should be present in the product treated at least one layer of fabric, which either consists wholly of cellulose acetate alternating either in the warp or in the weft or both, in any desired degree of alternation, with yarns of other non-thermoplastic fibres such as cotton, regenerated cellulose, linen, wool or natural silk. This alternation may be, for instance, 1, 2, 3 or more cellulose acetate yarns with 1, 2, 3 or more yarns of cotton or other non-thermoplastic fibres. For convenience the warp may be made with such alternation of cellulose acetate yarn and yarn of other fibres, while the weft may consist wholly of such cellulose acetate yarn or wholly of yarn of other fibres. However, the weft may consist of an alternation of such cellulose acetate yarns and non-thermoplastic yarns of other fibres, in which case if the fabric is made in ordinary looms, the alternations will be used in which either the warp or the weft consists wholly of cellulose acetate yarn while the other component consists of non-thermoplastic yarn.

Instead of employing a woven fabric, a knitted or netted fabric may be employed. Also a fabric containing mixed yarn containing both filaments of cellulose acetate and fibres of cotton or other non-thermoplastic material may be employed.

Only a single layer of fabric consisting wholly of cellulose acetate yarn or a single layer of any of the fabrics above described containing both cellulose acetate yarn or filaments and non-thermoplastic fibres may be treated by this invention, whereby relatively thin fabric having the desired degree of stiffness or impermeability throughout or only locally may be produced. Alternatively 2, 3, 4 or more of such fabric may be treated with water, and in the presence of a plasticizer, heat and pressure applied to the whole surface to form a composite fabric that is united throughout, or only in local areas by application of heat and pressure only at the desired local areas.

In another, and in some cases preferred, method of carrying out this invention, one or more fabrics consisting wholly of non-thermoplastic yarns, such as cotton, linen, reconstituted cellulose, wool or silk, is assembled with one or more fabrics consisting wholly of cellulose acetate yarn or of a mixture of cellulose acetate yarn and filaments and yarn of non-thermoplastic fibres, as above described, may be treated by this invention, whereby a composite fabric made up of a plurality of layers may be made. If a product is to be produced wherein all the layers thereof are united, it is of importance where two or more layers of fabric consisting wholly of non-thermoplastic material are used, that at least one layer of fabric consisting of or containing cellulose acetate yarn be interposed between two layers of such fabric.

Instead of employing the cellulose acetate in the form of yarns or filaments, it may be present in fabrics of any desired construction and made of yarns of cotton, reconstituted cellulose, linen, natural silk, wool or other non-thermoplastic fibres as a coating produced by impregnating the fabric with a solution of cellulose acetate.

The layer of cellulose acetate that is interposed between the fabrics may be in the form of finely divided powder with which a plasticizer may or may not be in intimate admixture. This powder may be blown or sprayed onto one or more layers of the fabrics to be laminated and if desired gums or other appropriate binders may be employed to cause such powder to adhere to the fabrics.

In still another form of this invention a fabric made of or containing non-thermoplastic fibres may be coated or impregnated with an intimate mixture of finely divided cellulose acetate with or without plasticizers, and binders or agglutinants such as methyl cellulose that swells in water, gum tragacanth, gum arabic, and this fabric is then interposed between two or more layers of fabric which consist wholly of non-thermoplastic fibres, such as cotton, linen, regenerated cellulose, wool, or natural silk.

In the case of cellulose acetate yarns, fabrics impregnated with solutions of cellulose acetate, powder and the like above described, wherein plasticizers are not incorporated during manufacture, such plasticizer may be added to such cellulose acetate products after they are formed or to the fabric of non-thermoplastic yarns with which they are laminated.

In order to increase the opacity of the final product or to impart special color effects thereto, finely divided white pigments such as titanium dioxide or antimony trioxide or colored pigments such as lamp black may be incorporated with the cellulose acetate.

As instances of the manner that the various fabrics may be assembled, the following are given. In the case of collars, cuffs, etc. where an exterior of cotton or linen is desired, a layer of fabric consisting wholly of or containing cellulose acetate yarn, as above described, and to which plasticizer has been applied, may be interposed between two layers of fabric consisting of cotton, linen or other non-thermoplastic fibres. An assembly that is also useful for such purposes comprises three layers of fabric consisting wholly of such non-thermoplastic yarns, with one layer of fabric consisting of or containing cellulose acetate yarn between two layers of such fabrics. Another type of assembly may be made having fabrics of cellulose acetate as the outer layers and an intermediate layer containing the plasticizer which intermediate layer may or may not contain cellulose acetate.

To obtain good adhesion, water should be present during the application of heat and pressure in accordance with this invention. The liquid may be applied to the assembly of fabrics having an intermediate layer containing cellulose acetate in any suitable manner, such as by dipping, spraying or brushing. A convenient manner of wetting the assembly is by padding the same with the water. If an assembly of two or more fabrics is treated, both sides of the assembly should be wetted with the water, as it is desirable that all of the layers of the fabric present be wetted therewith when heat and pressure is applied.

If heated devices that have desired designs, such as stripes, dots, rectangles or other geometric, floral or other designs, embossed thereon are employed, novel effects are obtained, since only those portions that come in contact with the embossed portions of the heated device become united, while the other portions retain the properties of the original fabrics. This local application of heat and pressure may be done by manually operated means if desired. By locally applying or having present the plasticizer only in those places which are to be united, the union of other portions upon subsequent laundering is avoided.

In order further to illustrate my invention but without being limited thereto, the following examples are given:

Example I

Fabric consisting wholly of acetone soluble cellulose acetate has applied thereto by dipping the same, a solution consisting of 60 parts of dimethoxyethyl phthalate, 10 parts of triacetin, 30 parts of ethyl alcohol. The ethyl alcohol is allowed to evaporate. The amount of plasticizer applied amounts of approximately 35% on the weight of the fabric.

This fabric is used as the intermediate layer between two layers of fabric consisting of cotton or linen fibres. The assembly is then wetted on both sides with water. Thereupon the assembly is pressed with a hot iron or calender to form a stiffened material in which the fabrics are united. Preferably the heating and pressing is done on both sides of the assembly. By controlling the degree of heat and pressure and/or selection of the type of fabrics employed the degree of stiffness may be controlled.

Example II

A fabric consisting of a fabric having two warps of cotton, one warp of cellulose acetate yarn woven with a weft having two picks of cotton and one pick of cellulose acetate yarn has applied thereto by dipping a solution of dimethoxyethyl phthalate triacetin and alcohol as a plasticizer. The proportions of the ingredients of the plasticizer are 60 parts dimethoxyethyl phthalate, 10 parts triacetin and 30 parts alcohol. The amount of plasticizer added amounts to 45% on the weight of the fabric. The alcohol is allowed to evaporate.

The fabric formed as above is interposed as an intermediate layer between two layers of fabric consisting solely of cotton fibres. The assembly is then wetted on both sides with water. Thereupon the assembly is pressed with a hot iron or calender to form a stiffened material in which the fabrics are united. Preferably, the heating and pressing is done on both sides of the assembly. The fabric produced is pliable, partially permeable, yet wrinkle-proof and exhibits excellent properties suitable for the making of collars for shirts.

Example III

A plasticized fabric made in accordance with either Example I or Example II is interposed between two layers of a fabric consisting wholly or partially of yarns of cellulose acetate. The assembly is then wetted on both sides with water. Thereupon the assembly is pressed with a hot iron or calender to form a stiffened material in which the fabrics are united. Preferably, the heating and pressing is done on both sides of the assembly. To prevent the glazing of the outer layers made in accordance with this example it is preferable that padded calenders be employed. This method produces a stiffened fabric containing cellulose acetate in the outer layers which in appearance are unaltered.

If collars or cuffs or bosoms or other articles which are to be sewn onto shirts or other articles of apparel are to be formed, it is advantageous to cut the assembly of fabrics to the desired shape or form and sew it to the shirt or other article prior to the application of the water and the heat and pressure so that the assembly is stiffened and united by wetting with water and application of heat and pressure only after the shirt or other article is completed.

The fabrics and articles obtained by this invention may be made more or less stiff as desired by controlling the amount of cellulose acetate present in the layer in the assembly of fabrics being treated; the more cellulose acetate present, the stiffer the resultant products. Likewise the softness may be controlled by the amount of plasticizer present, the greater the amount of plasticizer the softer the product.

While this invention has been described particularly in connection with cellulose acetate, such cellulose acetate may be replaced in whole or in part by other derivatives of cellulose such as cellulose nitrate, or cellulose formate, cellulose propionate, cellulose butyrate, or other organic esters of cellulose, or methyl cellulose, ethyl cellulose, and benzyl cellulose, or other cellulose ethers.

It is to be understood that the foregoing detailed description is given merely by way of illustration and many variations may be made therein, without departing from the spirit of my invention.

Having described my invention, what I desire to secure by Letters Patent is:

1. Method of imparting stiffness or other properties to a fabric containing thermoplastic derivative of cellulose, which comprises applying to said fabric a mixture of water-soluble and water-insoluble plasticizers for the derivative of cellulose and subjecting the so-treated fabric to the action of heat and pressure in the presence of water.

2. The method of imparting stiffness or other properties to a fabric containing at least two layers one of which contains an organic derivative of cellulose, which comprises applying to one of the layers a mixture of water-soluble and water-insoluble plasticizers for the organic derivative of cellulose, and uniting the layers by applying heat and pressure at least locally thereto in the presence of water.

3. The method of imparting stiffness or other properties to a fabric containing at least two layers one of which contains an organic derivative of cellulose, which comprises applying to one of the layers a plasticizer for the organic derivative of cellulose, said plasticizer containing dimethoxyethyl phthalate and triacetin and uniting the layers by applying heat and pressure at least locally thereto in the presence of water.

4. The method of imparting stiffness or other properties to a fabric containing at least two layers one of which contains cellulose acetate, which comprises applying to one of the layers a plasticizer for the cellulose acetate, said plasticizer containing dimethoxyethyl phthalate and triacetin and uniting the layers by applying heat and pressure at least locally thereto in the presence of water.

5. The method of imparting stiffness or other properties to a fabric containing at least two layers one of which contains an organic derivative of cellulose, which comprises applying to one of the layers a plasticizer for the organic derivative of cellulose, said plasticizer containing from 10 to 100 parts of triacetin to 100 parts of dimethyoxyethyl phthalate and uniting the layers by applying heat and pressure at least locally thereto in the presence of water.

6. The method of imparting stiffness or other properties to a fabric containing at least two layers one of which contains cellulose acetate, which comprises applying to one of the layers a plasticizer for the cellulose acetate, said plasticizer containing from 10 to 100 parts of triacetin to 100 parts of dimethoxyethyl phthalate and uniting the layers by applying heat and pressure at least locally thereto in the presence of water.

7. The method of imparting stiffness or other properties to a fabric containing at least two layers one of which contains a derivative of cellulose, which comprises applying to one of the layers a plasticizer for the derivative of cellulose, said plasticizer containing 60 parts of dimethoxyethyl phthalate and 10 parts of triacetin and uniting the layers by applying heat and pressure at least locally thereto in the presence of water.

8. The method of imparting stiffness or other properties to a fabric containing at least two layers one of which contains cellulose acetate, which comprises applying to one of the layers a plasticizer for the cellulose acetate, said plasticizer containing 60 parts of dimethoxyethyl phthalate and 10 parts of triacetin and uniting the layers by applying heat and pressure at least locally thereto in the presence of water.

9. A fabric for use as a stiffening layer in the lamination of wearing apparel and technical articles, which comprises a fabric containing a thermoplastic derivative of cellulose and between 35 and 50% on its weight of a plasticizer composed of dimethoxyethyl phthalate and triacetin.

10. A fabric for use as a stiffening layer in the lamination of wearing apparel and technical articles, which comprises a fabric containing cellulose acetate and between 35 and 50% on its weight of a plasticizer composed of dimethoxyethyl phthalate and triacetin.

11. The method of imparting stiffness or other properties to a fabric containing at least two layers one of which contains cellulose acetate, which comprises applying to one of the layers a mixture of water-soluble and water-insoluble plasticizers for the cellulose acetate, and uniting the layers by applying heat and pressure at least locally thereto in the presence of water.

12. The method of imparting stiffness or other properties to a fabric containing at least two layers one of which contains an organic derivative of cellulose, which comprises applying to one of the layers at least 35% on the weight of the fabric of a mixture of water-soluble and water-insoluble plasticizers for the organic derivative of cellulose, and uniting the layers by applying heat and pressure at least locally thereto in the presence of water.

13. The method of imparting stiffness or other properties to a fabric containing at least two layers one of which contains cellulose acetate, which comprises applying to one of the layers at least 35% on the weight of the fabric of a mixture of water-soluble and water-insoluble plasticizers for the cellulose acetate, and uniting the layers by applying heat and pressure at least locally thereto in the presence of water.

14. A fabric for use as a stiffening layer in the lamination of wearing apparel and technical articles, which comprises a fabric containing a thermoplastic derivative of cellulose and a mixture of water-soluble and water-insoluble plasticizers for the derivative of cellulose.

15. Wearing apparel or other technical article having a stiffened portion comprising a fabric containing a thermoplastic derivative of cellulose and also containing a water-insoluble plasticizer for the derivative of cellulose and at least a trace of a water-soluble plasticizer for the derivative of cellulose.

16. Wearing apparel or other technical article having a stiffened portion comprising a fabric containing cellulose acetate and also containing a water-insoluble plasticizer for the cellulose acetate and at least a trace of a water-soluble plasticizer for the cellulose acetate.

17. A fabric for use as a stiffening layer in the lamination of wearing apparel and technical articles, which comprises a fabric containing a thermoplastic derivative of cellulose and between 35 and 50% on its weight of a mixture of water-soluble and water-insoluble plasticizers for the derivative of cellulose.

18. A fabric for use as a stiffening layer in the lamination of wearing apparel and technical articles, which comprises a fabric containing cellulose acetate and between 35 and 50% on its weight of a mixture of water-soluble and water-insoluble plasticizers for the cellulose acetate.

CAMILLE DREYFUS.